United States Patent
Pirmann

(10) Patent No.: US 8,651,739 B2
(45) Date of Patent: Feb. 18, 2014

(54) X-RAY CASSETTE FOR A PHOSPHOR STORAGE PLATE AND CORRESPONDING SYSTEM AND METHOD FOR READING OUT A PHOSPHOR STORAGE PLATE

(75) Inventor: Anton Pirmann, Munich (DE)

(73) Assignee: Agfa HealthCare NV, Mortsel (BE)

( * ) Notice: Subject to any disclaimer, the term of this patent is extended or adjusted under 35 U.S.C. 154(b) by 348 days.

(21) Appl. No.: 13/124,999

(22) PCT Filed: Oct. 13, 2009

(86) PCT No.: PCT/EP2009/063340
§ 371 (c)(1),
(2), (4) Date: Apr. 19, 2011

(87) PCT Pub. No.: WO2010/046278
PCT Pub. Date: Apr. 29, 2010

(65) Prior Publication Data
US 2011/0200174 A1   Aug. 18, 2011

(30) Foreign Application Priority Data

Oct. 21, 2008  (EP) ..................... 08167136

(51) Int. Cl.
*G03B 42/04* (2006.01)
(52) U.S. Cl.
USPC .......................................... 378/181; 378/172
(58) Field of Classification Search
USPC ................. 378/181, 172, 171, 173, 174, 182
See application file for complete search history.

(56) References Cited

U.S. PATENT DOCUMENTS 4,555,213 A * 11/1985 Tamura et al. ................. 414/412
4,860,042 A * 8/1989 Tajima et al. ................. 396/519
(Continued)

FOREIGN PATENT DOCUMENTS

EP  0 313 686 A1  5/1989
EP  1791022 A1  5/2007
(Continued)

OTHER PUBLICATIONS

International Search Report completed on Feb. 13, 2009, from priority application No. EP08167136.4, filed on Oct. 21, 2008.

(Continued)

*Primary Examiner* — Hoon Song
(74) *Attorney, Agent, or Firm* — Houston & Associates, LLP

(57) ABSTRACT

The invention relates to an X-ray cassette (42, 50, 78, 82) for a phosphor storage plate (20), having two openings (14, 44) for inserting the phosphor storage plate (20) into the X-ray cassette (42, 50, 78, 82) and for withdrawing the phosphor storage plate (20) arranged in the X-ray cassette (42, 50, 78, 82) from the cassette. Two flaps (18, 48, 54, 80, 84) are also provided for closing the two openings (14, 44). The invention also relates to a system (10) comprising said type of X-ray cassette (42, 50, 78, 82) and a reading out device (34) for reading out the phosphor storage plate (20) arranged in the X-ray cassette (42, 50, 78, 82). The reading-out device (34) comprises a feeding element (32) for feeding the X-ray cassette (42, 50, 78, 82) into the device. Said feeding element (32) is designed in such a manner that if the X-ray cassette (42, 50, 78, 82) is fed into the feeding element with one of its openings (14), the other opening (44) of the X-ray cassette (42, 50, 78, 82) is accessible to an operator.

18 Claims, 9 Drawing Sheets

(56) References Cited

U.S. PATENT DOCUMENTS

Figure 1:
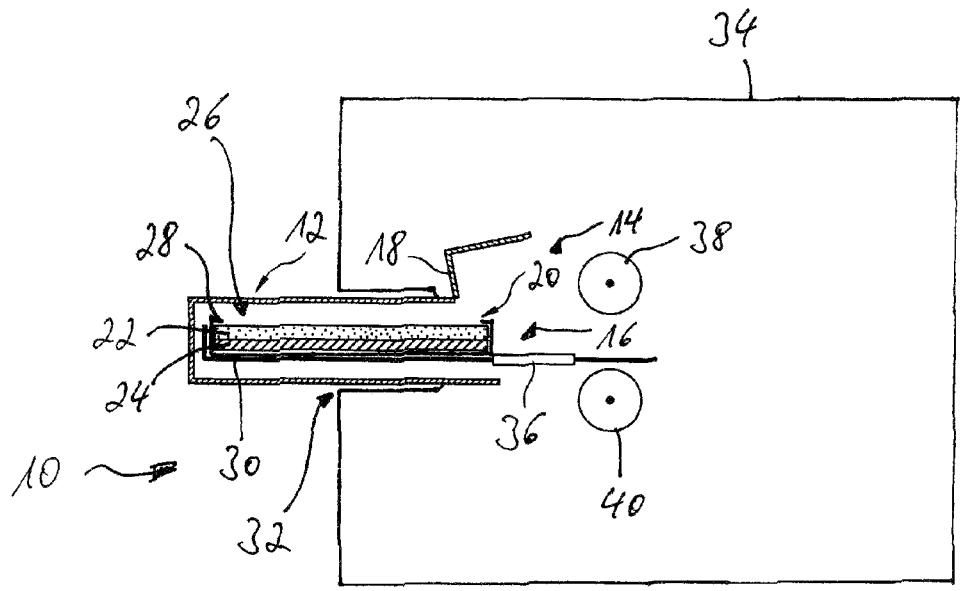

| | | | |
|---|---|---|---|
| 4,909,389 A | 3/1990 | Plessers et al. | |
| 7,432,512 B2 | 10/2008 | Pirmann et al. | |
| 7,498,599 B2 | 3/2009 | Pirmann et al. | |

FOREIGN PATENT DOCUMENTS

| | | |
|---|---|---|
| EP | 1895364 A1 | 3/2008 |
| JP | 07036131 A | 2/1995 |
| JP | 2000039683 A | 2/2000 |
| JP | 2000241920 A | 9/2000 |
| JP | 2002182322 A | 6/2002 |
| JP | 2003195435 A | 7/2003 |
| JP | 2006106186 A | 4/2006 |
| JP | 2007133318 A | 5/2007 |

OTHER PUBLICATIONS

International Preliminary Report on Patentability dated Apr. 26, 2011, from priority application No. PCT/EP2009/063340, filed on Oct. 13, 2009.

* cited by examiner

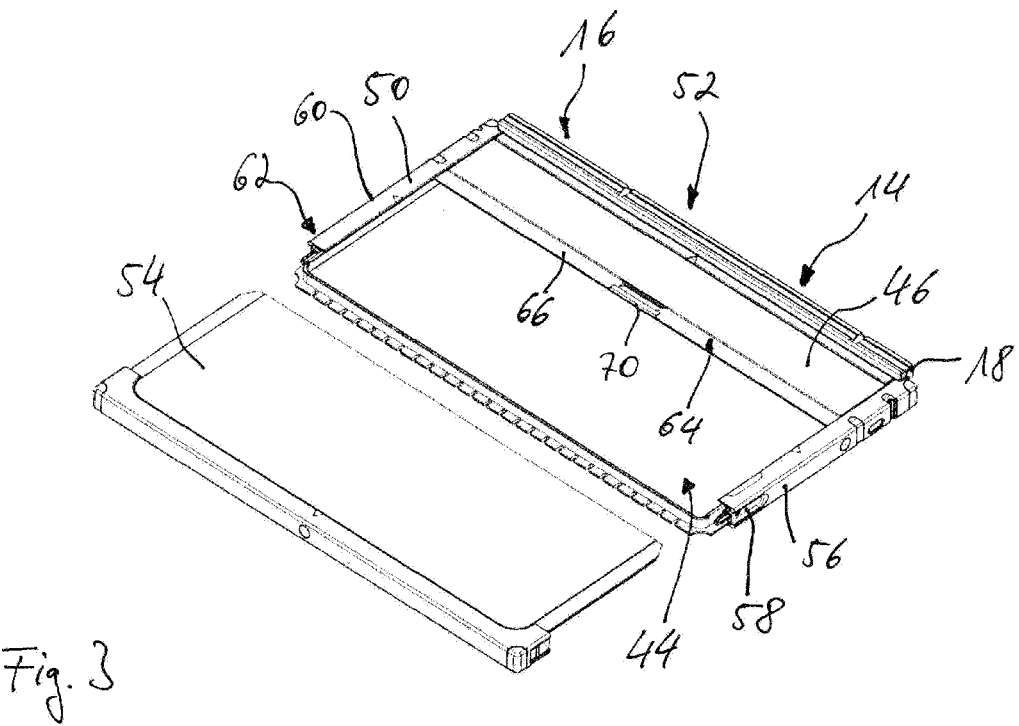

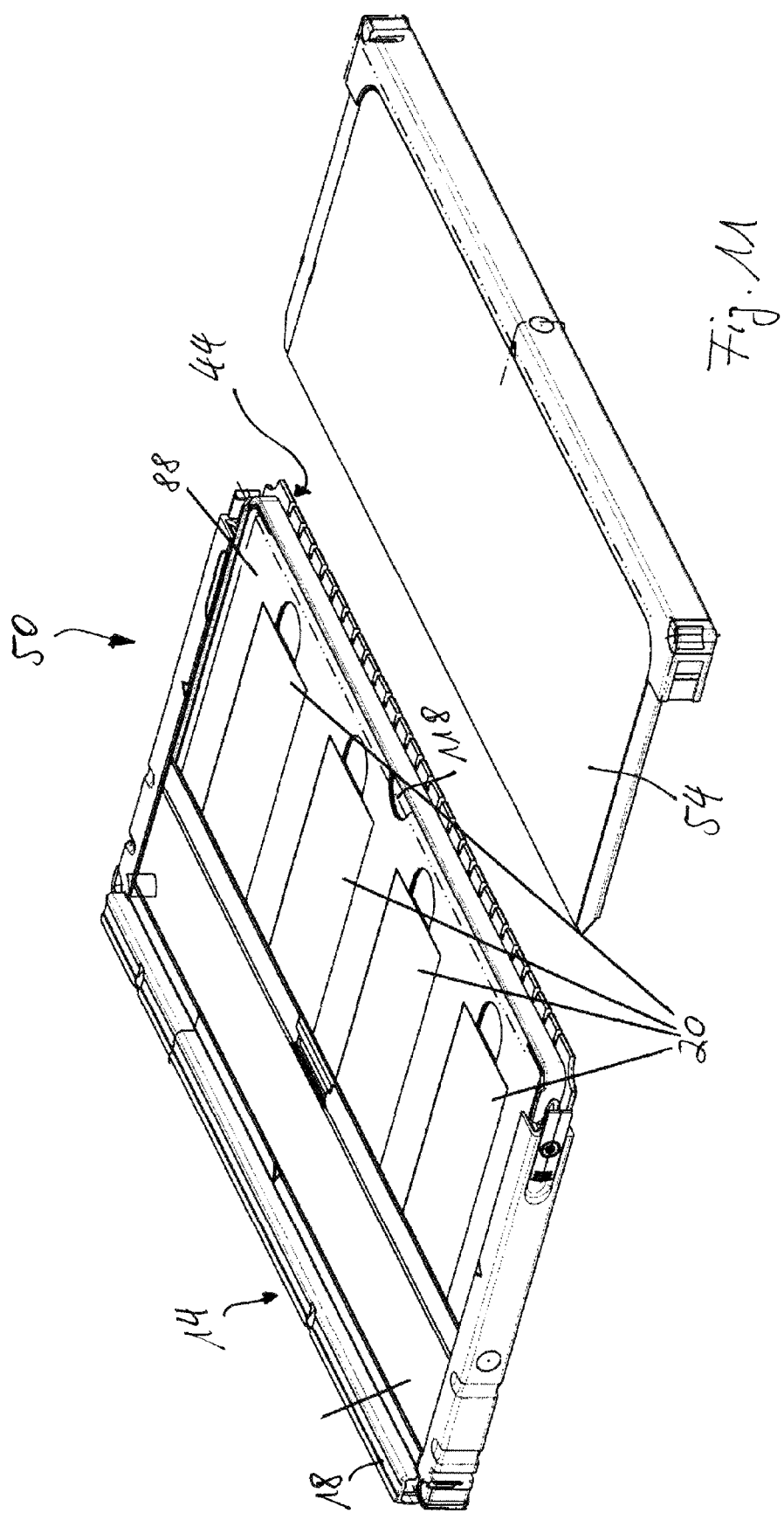

X-RAY CASSETTE FOR A PHOSPHOR STORAGE PLATE AND CORRESPONDING SYSTEM AND METHOD FOR READING OUT A PHOSPHOR STORAGE PLATE

The present invention relates to an X-ray cassette for a storage phosphor plate and to a corresponding system and method for reading out a storage phosphor plate located within the X-ray cassette.

In radiography, for diagnostic purposes an image of an object is produced by means of X-ray irradiation, said image being stored as a latent X-ray image in a storage phosphor layer. Therefore, this X-ray image contains image information on the object. The recording of X-ray images is used in particular in the field of medicine and in the field of the non-destructive testing (NDT) of objects, such as e.g. a welded seam. In order to read out the image information stored in the storage phosphor layer the storage phosphor layer is stimulated in a read-out apparatus by means of an irradiation device. This stimulation causes the storage phosphor layer to emit emission radiation which has an intensity corresponding to the quantity of image information of the X-ray image stored in the storage phosphor layer. The emission radiation emitted by the storage phosphor layer is collected by a detector and converted into electrical signals which contain an image of the image information. The electrical signals are further processed, and the image information stored in the storage phosphor layer is then made visible. For further analysis the image information can be displayed, for example, directly on a monitor or be written onto a photographic X-ray film by means of a printer that can be used especially for X-ray images.

The storage phosphor layer is applied to a support layer, and together they form a storage phosphor plate. For handling, the storage phosphor plate is generally located protected within an X-ray cassette which is introduced into the read-out apparatus for reading out the image information stored in the storage phosphor layer. The storage phosphor plate is removed from the X-ray cassette within the read-out apparatus. For this purpose the X-ray cassette has an opening through which the storage phosphor plate located within the X-ray cassette can be removed from the X-ray cassette and the storage phosphor plate located outside of the X-ray cassette can be inserted into the X-ray cassette.

It is the object of the present invention to extend the scope of use of an X-ray cassette and to enable easy and secure holding of a storage phosphor plate within the X-ray cassette.

This object is achieved with an X-ray cassette comprising a receptacle for receiving at least one storage phosphor plate, the receptacle being designed such that the storage phosphor plate can remain in the receptacle while reading out the storage phosphor plate in a read-out apparatus and can be removed from the receptacle after the read-out, and a first and a second opening, it being possible for the receptacle to be introduced by an operator into the X-ray cassette through the first opening together with the at least one received storage phosphor plate, and to be removed from the X-ray cassette through the second opening and to be conveyed into the interior of the read-out device when the X-ray cassette with the second opening is fed into the read-out apparatus. Additionally, the object is also achieved with a system having an X-ray cassette as previously detailed and further including a read-out apparatus for reading out the storage phosphor plate received in the receptacle, the read-out apparatus including a feed device for feeding the X-ray cassette, and the feed device being designed such that in the event that the X-ray cassette with the second opening is fed into the feed device, the first opening of the X-ray cassette is accessible for an operator. Additionally, the object is also achieved according to a method for reading out storage phosphor plates comprising loading a receptacle with at least one storage phosphor plate and introducing the loaded receptacle into an X-ray cassette through a first opening of the X-ray cassette, removing the loaded receptacle from the X-ray cassette through a second opening of the X-ray cassette which is fed into a read-out apparatus, and reading out the storage phosphor plate located in the removed receptacle, returning the loaded receptacle into the X-ray cassette fed into the read-out apparatus through the second opening of the X-ray cassette, and removing the receptacle from the X-ray cassette through the first opening of the X-ray cassette and removing the read out storage phosphor plate from the receptacle.

The X-ray cassette according to the invention comprises a receptacle for receiving at least one storage phosphor plate, the receptacle being designed such that the storage phosphor plate can remain in the receptacle while reading out the storage phosphor plate in a read-out apparatus and can be removed from the receptacle after the read-out, and further comprises a first and a second opening, it being possible for the receptacle to be introduced by an operator into the X-ray cassette through the first opening together with the at least one received storage phosphor plate, and to be removed from the X-ray cassette through the second opening and to be conveyed into the interior of the read-out device when the X-ray cassette with the second opening is fed into the read-out apparatus.

The receptacle makes it possible to receive storage phosphor plates which are not of a standard size corresponding to the respective X-ray cassette. It is thus possible to receive a wide variety of storage phosphor plates of any size and/or geometry in a standard X-ray cassette. Due to the corresponding configuration of the receptacle it is moreover possible to convey the latter together with the storage phosphor plates to be read out through the read-out apparatus, by means of which on the one hand safe and trouble-free conveyance of the received storage phosphor plates, and on the other hand a reliable read-out of the storage phosphor plates is guaranteed. The receptacle can be removed from the X-ray cassette by an operator, by means of which it is possible to load the receptacle with storage phosphor plates to be read out or to remove the latter from the receptacle after the read-out in a simple manner.

Moreover, the X-ray cassette according to the invention has two openings for inserting the receptacle into the X-ray cassette and for removing it from the cassette. In this way it is advantageously possible to design one opening, e.g. on a face side of the X-ray cassette, especially for removing and returning the receptacle in a read-out apparatus and the other opening, e.g. in the region of a wide side of the X-ray cassette, for inserting and removing the receptacle by an operator as ergonomically as possible. In this way, in addition to easy and secure receiving of a wide variety of storage phosphor plates in the X-ray cassette, flexible usability for medical, e.g. dental, and non-medical applications e.g. NDT, is achieved. Preferably two closures for closing the two openings are provided.

The system according to the invention has an X-ray cassette according to the invention and a read-out apparatus for reading out the storage phosphor plate received in the receptacle. The read-out apparatus has a feed device here for feeding the X-ray cassette. This feed device is configured such that in the event that the X-ray cassette is fed into the feed device with one of its openings, the other of the openings of the X-ray cassette is accessible to an operator. In this way it is advantageously possible to extend the scope of use of the system according to the invention, in particular of its read-out apparatus. The operator can load and unload the X-ray cassette with one opening sitting in the read-out apparatus easily and conveniently by means of the other opening with one or more storage phosphor plates. This can be advantageous for specific applications, in particular in the dental field or for NDT.

The method according to the invention for reading out storage phosphor plates comprises the following steps: loading a receptacle, preferably located outside of the X-ray cassette, with at least one storage phosphor plate and introducing the loaded receptacle into an X-ray cassette through a first opening of the X-ray cassette; removing the loaded receptacle from the X-ray cassette through a second opening of the X-ray cassette which is fed into a read-out apparatus, and reading out the storage phosphor plate located in the removed receptacle; returning the loaded receptacle into the X-ray cassette fed into the read-out apparatus through the second opening of the X-ray cassette; removing the receptacle from the X-ray cassette through the first opening of the X-ray cassette and removing the read out storage phosphor plate from the receptacle. With this operating sequence on the one hand the loading of the receptacle with storage phosphor plates, introducing and removing the loaded receptacle into and from the X-ray cassette and removing the read out storage phosphor plates from the receptacle can on the one hand take place easily. Moreover, safe conveyance of a number of storage phosphor plates within the read-out apparatus and reliable read-out of the storage phosphor plates are guaranteed.

In one advantageous embodiment of the invention the two openings are formed on different external surfaces of the cassette. This guarantees particularly high usability of the X-ray cassette for different fields of use. Accessibility to the interior of the X-ray cassette is advantageously further improved.

The X-ray cassette has four narrow side surfaces, in the following also called front surfaces, and two wide side surfaces, in the following also called cover surfaces. In a further advantageous embodiment one of the openings is formed on a front surface of the X-ray cassette. In this way the X-ray cassette is matched well to already existing read-out apparatuses which introduce storage phosphor plates into the X-ray cassette and remove it from the latter via this type of opening in the front surface.

In one particularly preferred embodiment of the invention one of the openings is formed on a cover surface of the X-ray cassette. This advantageously guarantees particularly good access to the interior of the X-ray cassette, particularly for an operator. This applies above all for the case where the latter sits in the read-out apparatus.

In one particularly preferred embodiment the closure for closing the opening formed on the cover surface is produced by means of a detachable cassette part. This closure is easy to produce, and is easy to handle, particularly by the operator.

Alternatively, the closure for closing the opening formed on the cover surface can be produced by means of a cassette part moveable along the cover surface of the X-ray cassette. This closure can also be produced easily and is easy to handle, particularly for the operator. Furthermore, the closure is applied to the X-ray cassette in a particularly space-saving way in its open state.

With a further alternative embodiment the closure for closing the opening formed on the cover surface is produced by means of a pivotable cassette part. This closure is particularly easy to produce and can be handled very easily and reliably, particularly by the operator.

In a further advantageous embodiment of the invention in the region of a closure edge on which a side surface of the X-ray cassette and a closure of an opening meet in the closed state, a screen or an overlap is provided in which the closure and the side surface of the X-ray cassette partially overlap, the closure edge being covered such as to be impermeable to light by the screen or the overlap. Due to the closure of the X-ray cassette which is guaranteed to be particularly well impermeable to light, particularly good results when reading out the X-ray information from the storage phosphor plate are possible.

Preferably at least one of the closures can be closed by means of a spring, in particular a catch spring. Advantageously this spring guarantees easy and reliable closure and opening of the at least one closure. Furthermore, this closure is particularly easy to produce.

Figure 2:
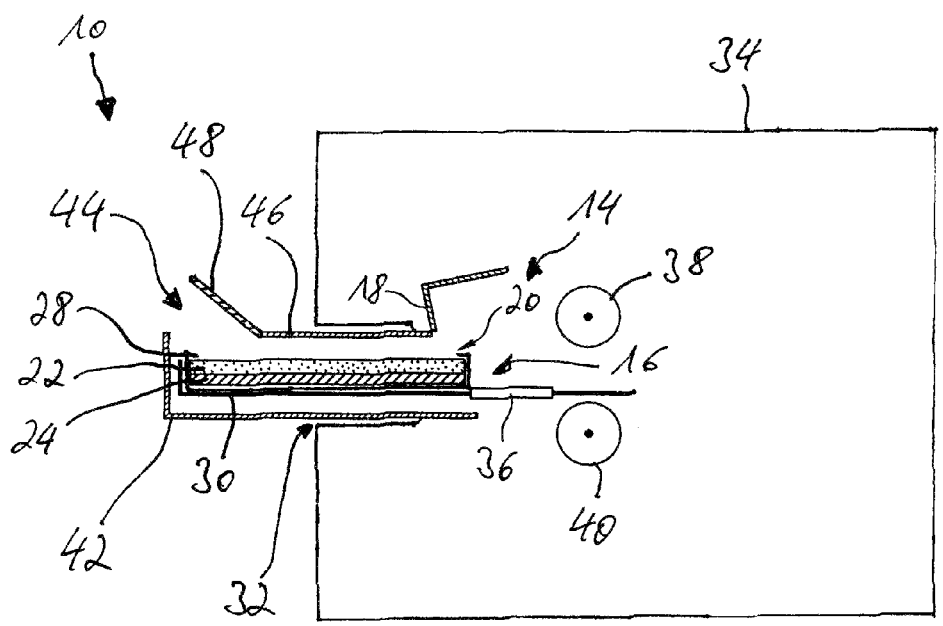
Figure 5A:
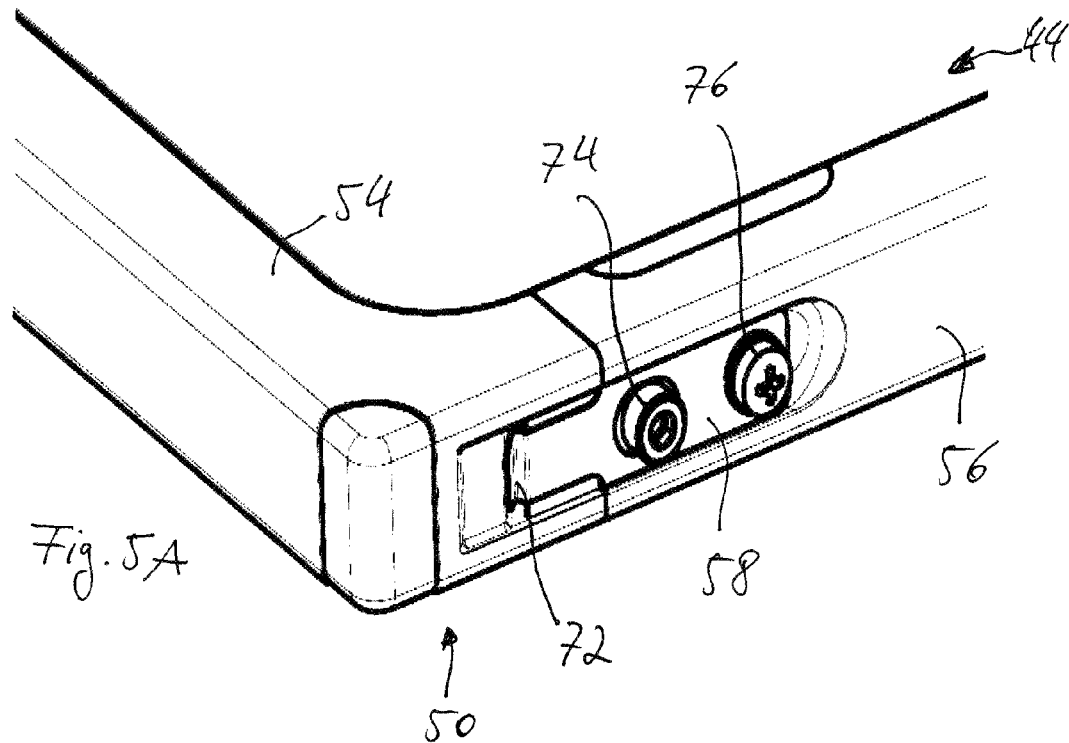
Figure 6A:
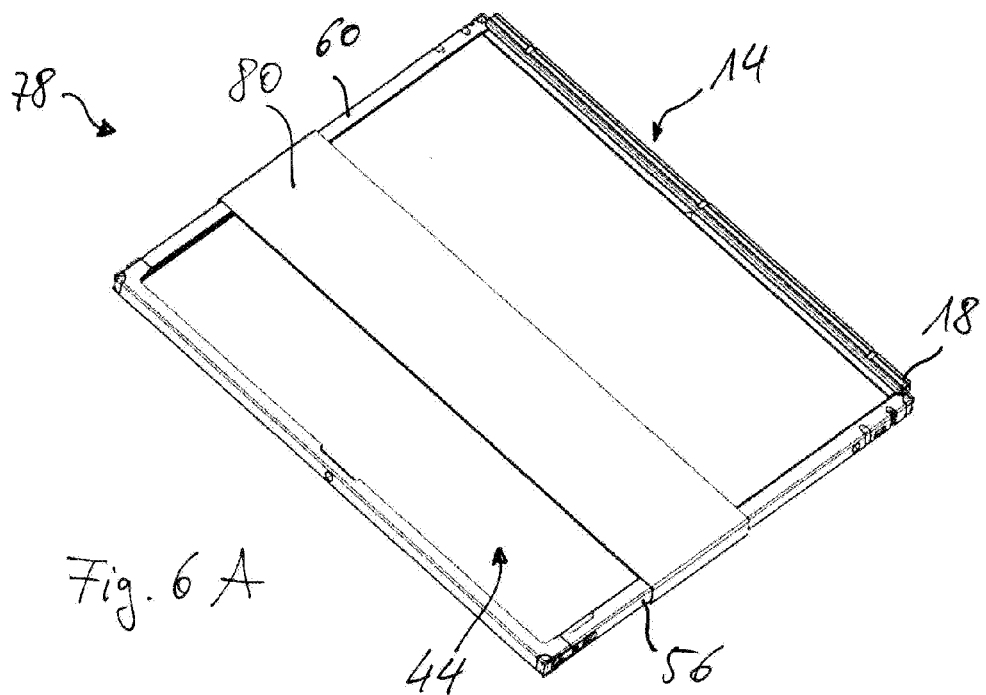
Figure 7A:
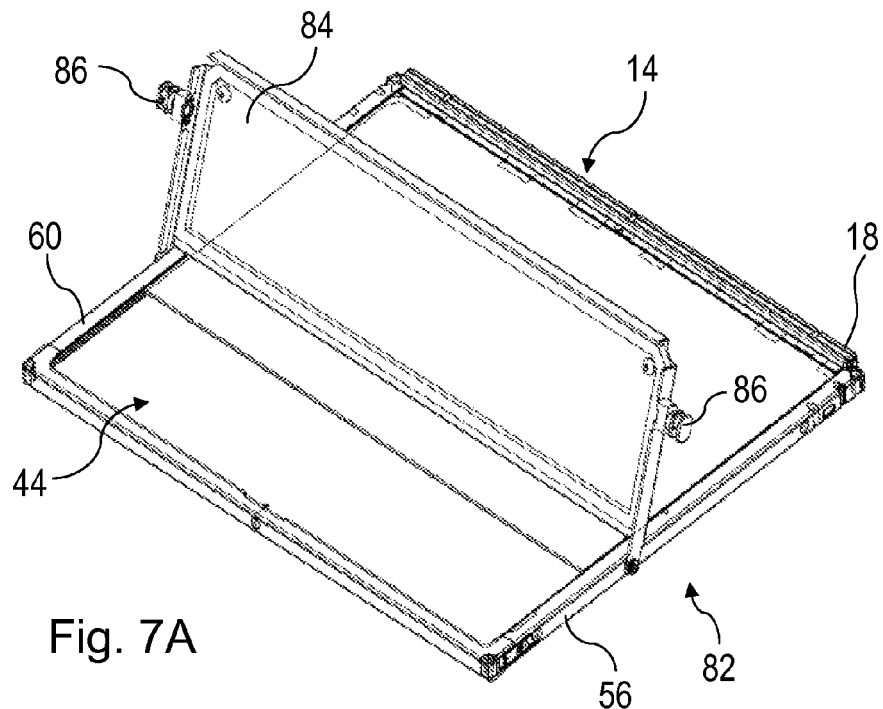
Figure 8:
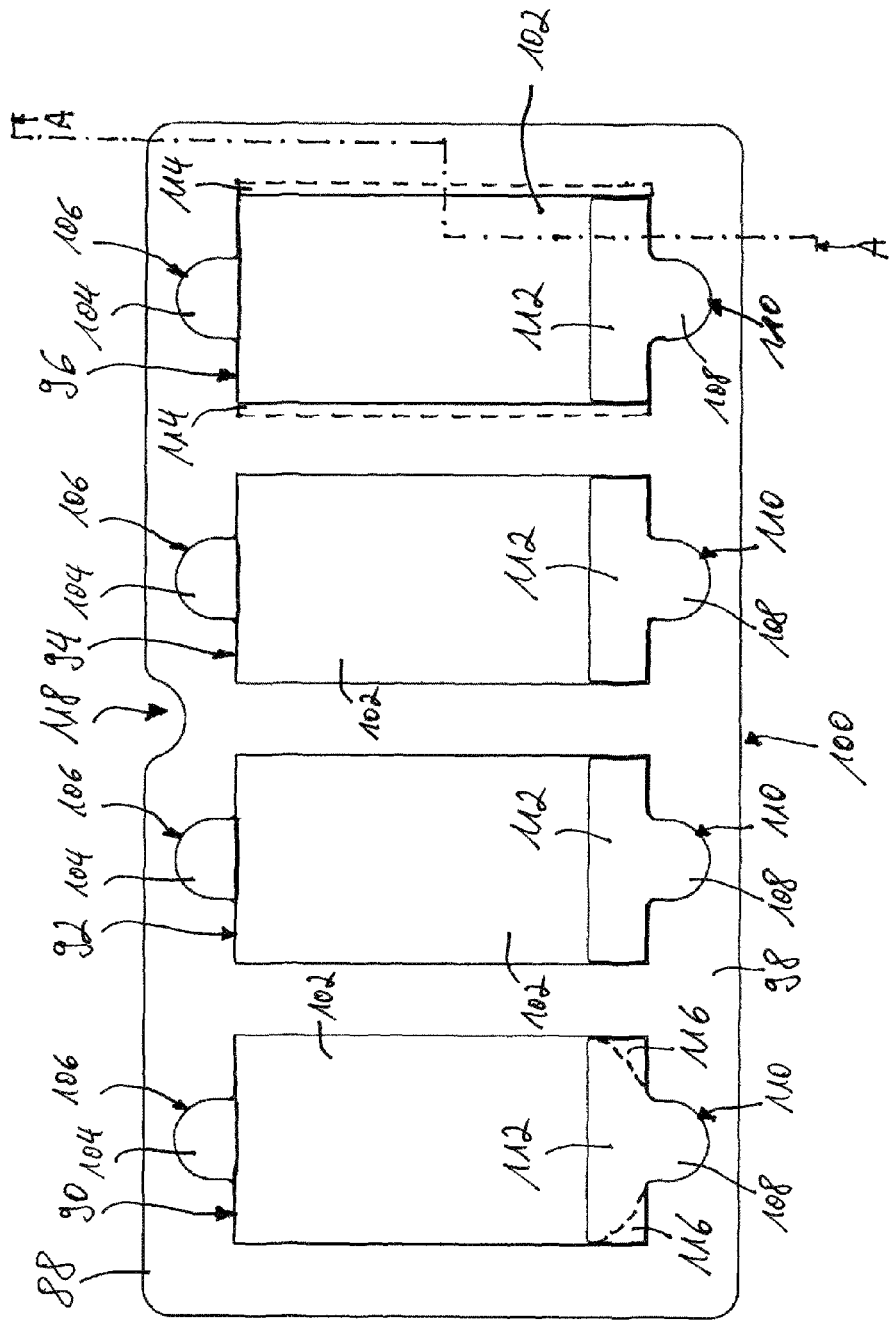
Figure 9:
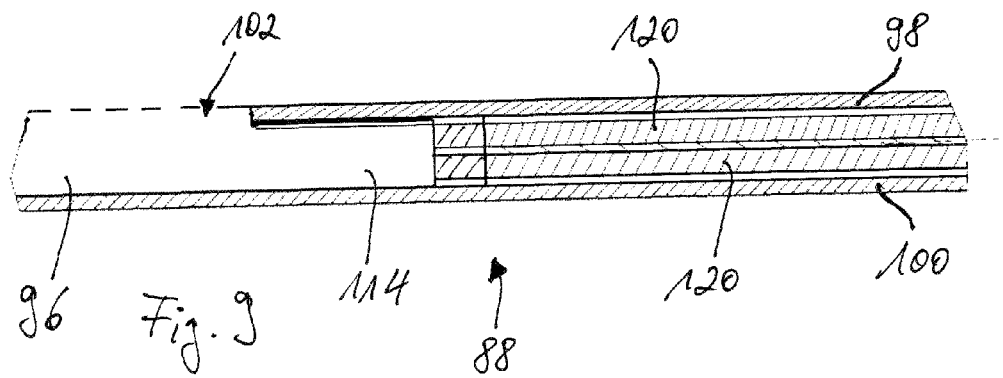
Figure 10A:
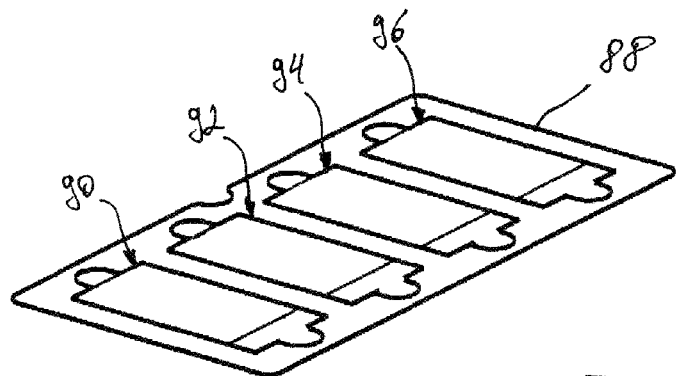
Figure 12:
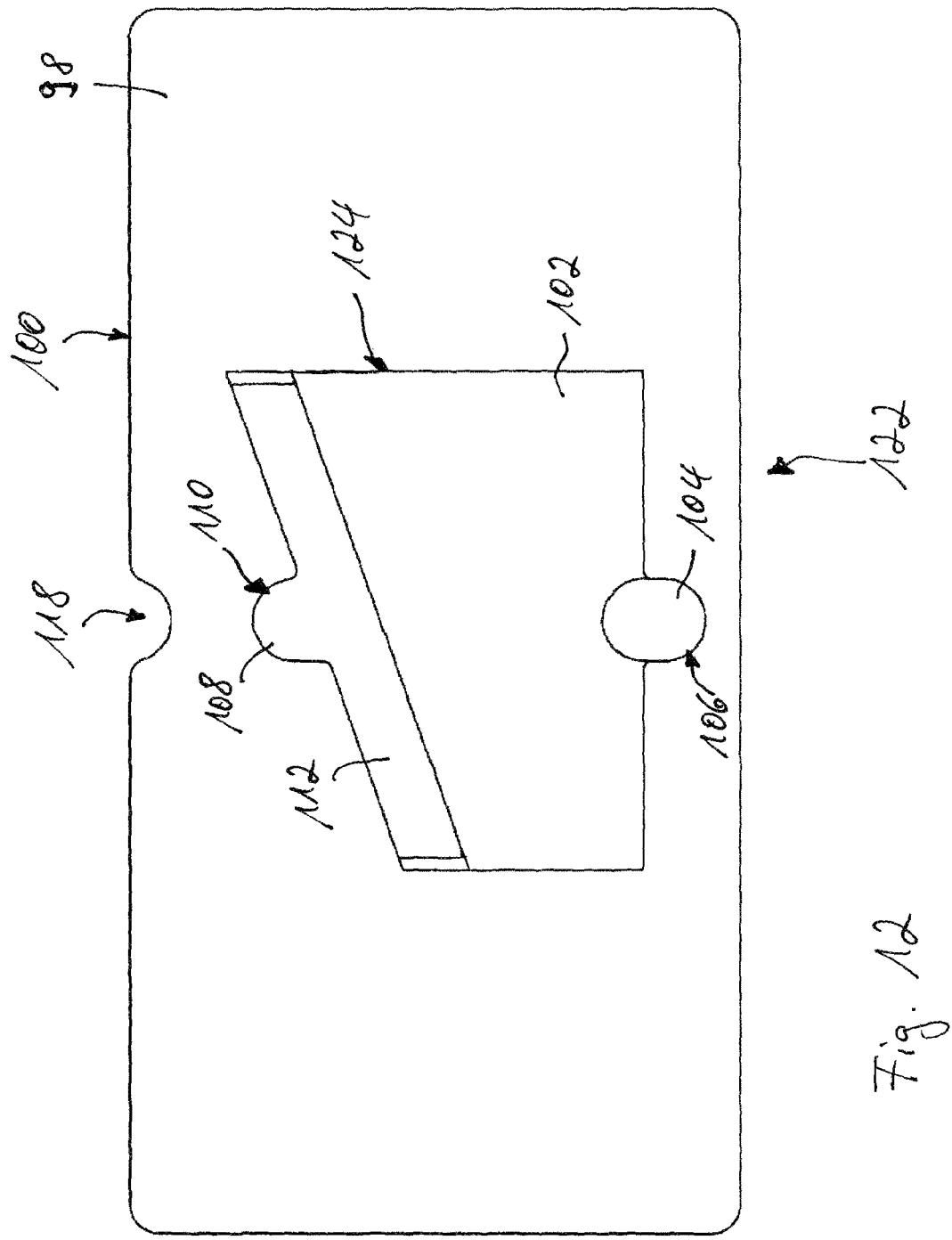

Further advantages of the invention are given by the following description of exemplary embodiments, reference being made to the attached drawings. These show as follows:

FIG. 1 a diagrammatic illustration of an exemplary embodiment of a system comprising an X-ray cassette, which has an opening, and a read-out apparatus for reading out a storage phosphor plate, FIG. 2 a diagrammatic illustration of an exemplary embodiment of a system comprising an X-ray cassette, which has two openings, and the read-out apparatus for reading out a storage phosphor plate, FIG. 3 a diagrammatic illustration of an exemplary embodiment of an X-ray cassette having a detachable cover part as a closure for one if its openings, FIG. 4 a diagrammatic illustration of a section through the X-ray cassette according to FIG. 3, FIGS. 5A, B diagrammatic illustrations of a closure spring for closing the detachable cover part of the X-ray cassette according to FIG. 3, FIGS. 6A, B diagrammatic illustrations of an exemplary embodiment of an X-ray cassette having a moveable cover part as a closure for one of its openings, FIGS. 7A, B diagrammatic illustrations of an exemplary embodiment of an X-ray cassette having a pivotable cover part as a closure for one of its openings, FIG. 8 a diagrammatic illustration of a top view of an exemplary embodiment of a receptacle having a number of receiving chambers for symmetrical storage phosphor plates, FIG. 9 a diagrammatic illustration of a cross-section of the receiving apparatus according to FIG. 8, FIGS. 10A, B diagrammatic illustrations of perspective views of the receiving apparatus according to FIG. 8 with or without received storage phosphor plates, and FIG. 11 a further diagrammatic illustration of the X-ray cassette according to FIG. 3 having a receptacle located in its interior according to FIG. 8, FIG. 12 a diagrammatic illustration of a top view of an exemplary embodiment of a receptacle having a single receiving chamber for an asymmetrical storage phosphor plate.

In the following, unless specified to the contrary, the same reference numbers are used for the same elements or elements with the same effect.

FIG. 1 shows a system 10 with an X-ray cassette 12 which has an opening 14. The opening 14 is formed here on a narrow front surface 16 of the X-ray cassette 12. In order to open and close the opening 14 the X-ray cassette 12 has a pivotable closure 18. Within the X-ray cassette 12 there is a storage phosphor plate 20 which can be conveyed through the opening 14 out of the X-ray cassette 12 and from outside of the X-ray cassette 12 into the latter. The X-ray cassette 12 contains a storage phosphor layer 22 for storing X-ray information and a support layer 24 to which the storage phosphor layer 22 is applied. The storage phosphor plate 20 is disposed in a receiving chamber 26 of a receptacle 28 in which the storage phosphor plate 20 is held securely. The storage phosphor plate 20 lies on a withdrawable drawer 30 within the X-ray cassette 12.

The X-ray cassette 12 sits in a feed device 32 of a read-out apparatus 34 for reading out the storage phosphor plate 20 located within the X-ray cassette 12. The read-out apparatus 34 contains a device for opening and closing the closure 18 of the X-ray cassette 12. The read-out apparatus 34 further contains a removal device 36 which, with the closure 18 open, engages on the edge of the drawer 30 and pulls the latter together with the storage phosphor plate 20 lying on top of it out of the X-ray cassette 12 in the direction of two feed rollers 38 and 40 disposed one over the other. The feed rollers 38, 40 grasp the storage phosphor plate 20 located in the receptacle 28 and convey it further into the interior of the read-out apparatus 34 for further processing. After the read-out of X-ray information stored in the storage phosphor layer 22 the storage phosphor plate 20 is conveyed back into the X-ray cassette 12. During processing within the read-out apparatus 34 the storage phosphor plate 20 remains in the receptacle 28. The read-out apparatus 34 is known in principle, and so is not described in any further detail. With regard to this, reference is made in particular to the general prior art described above.

FIG. 2 shows the system 10 with an X-ray cassette 42 which has two openings. In addition to the opening 14 on its front surface 16 the X-ray cassette 42 has an opening 44 on its cover surface 46. Located within the X-ray cassette 42 is the storage phosphor plate 20. The latter can be conveyed through the opening 44 out of the X-ray cassette 12 and from outside of the X-ray cassette 12 into the latter. The opening 44 can be opened and closed by a closure 48 which can be pivoted here. The X-ray cassette 42 sits with its opening 14 in the feed device 32 of the read-out apparatus 34. In this position the opening 44 projects out of the feed device 32, and is in particular accessible to an operator. Advantageously, the operator can operate the closure 48 and move the storage phosphor plate 20 into the X-ray cassette 42 or out of it as required while it sits in the feed device 32. In the present exemplary embodiment according to FIG. 2 the storage phosphor plate 20 is located in the receptacle 28. It order to utilise the advantages of the X-ray cassette 42 with its two openings 14 and 44 the storage phosphor plate 20 does not, however, necessarily require the receptacle 28. In fact, in so far as it has a size and shape suitable for the interior of the X-ray cassette 42, the storage phosphor plate 20 can also be stored in the X-ray cassette 42 without a receptacle 28.

FIG. 3 shows an X-ray cassette 50 with two openings 14 and 44 for introducing a storage phosphor plate into the X-ray cassette 50 and for removing the storage phosphor plate located within the X-ray cassette 50 from the X-ray cassette 50. The opening 14 is formed on the narrow front surface 16 of the X-ray cassette 50 and can be opened and closed by means of the closure 18. Here the closure 18 is substantially L-shaped or in the form of a hook and pivotably attached to the front surface 16 at a joint along a cross-over of the cover surface 46 of the X-ray cassette 50. The opening 44 is formed in the cover surface 46. In the present exemplary embodiment the opening 44 is a distance away from the cross-over of the cover surface 46 towards the front surface 16 and extends to a left- and right-hand peripheral region substantially over the whole width of the X-ray cassette 50. Here the opening 44 further comprises a narrow front surface 52 which lies opposite the front surface 16. The opening 44 can be opened and closed by means of a detachable cover part 54 as a closure 48.

A closure spring 58 is attached to a narrow side surface 56 of the X-ray cassette 50 as a closure mechanism for opening and closing the opening 44. Advantageously a further closure spring 62 is provided on a side surface 60 of the X-ray cassette 50 lying opposite the side surface 56. In this way the functionality of the opening and closing is improved. On one closure edge 64 where the X-ray cassette 50 and its cover part 54 meet one another in the closed state of the opening 44 a screen is applied to the X-ray cassette 50 in order to guarantee the impermeability to light of the X-ray cassette 50 in its closed state. Here the screen is in the form of a narrow overlap 66 so that when the opening 44 is closed this overlap 66 extends in the region of the closure edge 64 below the cover part 54. In principle it is also possible to design the screen differently. For example, the overlap 66 can be applied such that it extends over the cover part 54 when the opening 44 is closed.

For secure and reliable closing of the opening 44 by the cover part 54, in one region of the closure edge 64 where the X-ray cassette 50 and its cover part 54 meet one another in the closed state of the opening 44, opposing detents are provided in the X-ray cassette 50 and the cover part 54. These opposing detents engage with one another in the closed state of the opening 44. The detents can substantially extend over the whole width of the closure edge 64. However, it is also possible to limit the spread of the detents to one part of the closure edge 64. For the sake of simplicity the detents extend here over a partial region of the closure edge 64 which lies approximately in the centre of the width extension of the closure edge 64. The detent provided in the X-ray cassette 50 is advantageously formed in the overlap 66.

FIG. 4 illustrates this closure mechanism by means of the opposing detents. FIG. 4 shows a portion of a cross-section of the X-ray cassette 50 according to FIG. 3 when the opening is closed 44. A downwardly directed detent 68 in the cover part 54 and an upwardly directed detent 70 in the X-ray cassette 50 are shown. The two detents 68, 70 engage with one another in the illustrated closed state of the opening 44. FIG. 4 also illustrates the L-shaped closure 18 for closing the opening 14 on the front surface 16. In the illustration according to FIG. 4 the closure 18 is pivoted upwardly in its open state. Therefore the opening 14 is open.

Figure 5B:
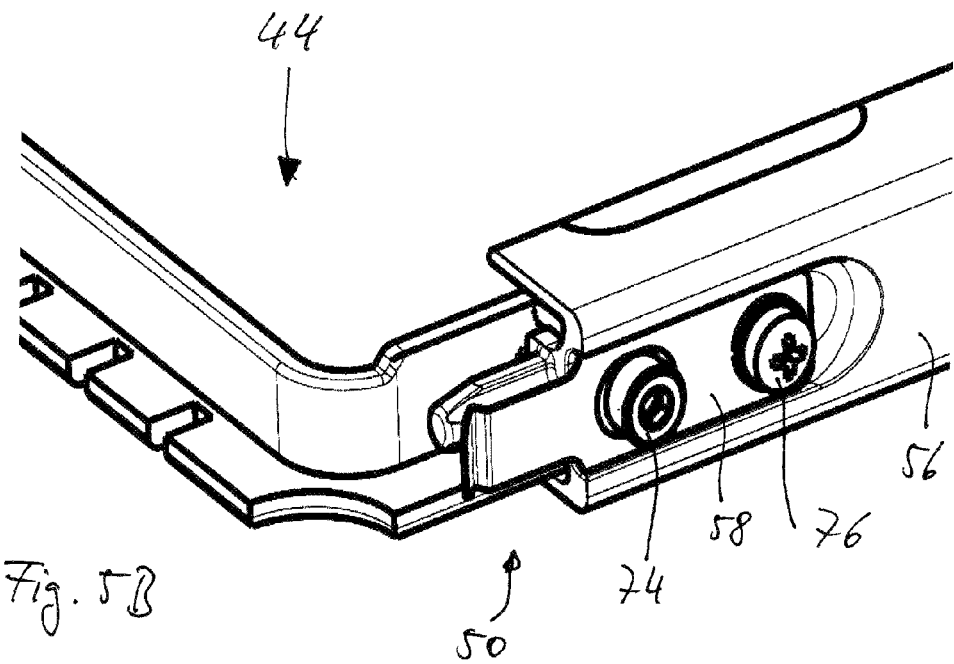

FIG. 5A and FIG. 5B illustrate the closure spring 58 for closing the detachable cover part 54 of the X-ray cassette 50 according to FIG. 3. The closure spring 58 is attached to the side surface 56 of the X-ray cassette 50. In the illustration according to FIG. 5A the cover part 54 is fastened to the X-ray cassette 50 so that the opening 44 is closed. The closure spring 58 engages with the cover part 54. For this purpose the closure spring 58 has a detent 72 on its tip. This detent 72 engages with the cover part 54 and locks the latter to the X-ray cassette 50. The closure spring 58 is fastened to the X-ray cassette 50 by means of two screws 74 and 76. If the closure spring 58 is pressed inwardly in the direction of the interior of the X-ray cassette 50, the detent 72 is released from the cover part 54. The latter can then be removed from the X-ray cassette 50. The illustration according to FIG. 5B illustrates the configuration of the closure spring 58. FIG. 5B shows a section of the X-ray cassette 50 with the opening 44 open. The cover part 54 is not fastened to the X-ray cassette 50. FIG. 5B clearly shows the detent 72 of the closure spring 58. The closure spring 58 can advantageously be of a suitable length so as to thus optimally set the force required to release the cover part 54. This force should not be too great so that simple opening is made possible for the operator. The closure spring 62 optionally attached to the side surface 60 advantageously corresponds to the closure spring 58.

Figure 6B:
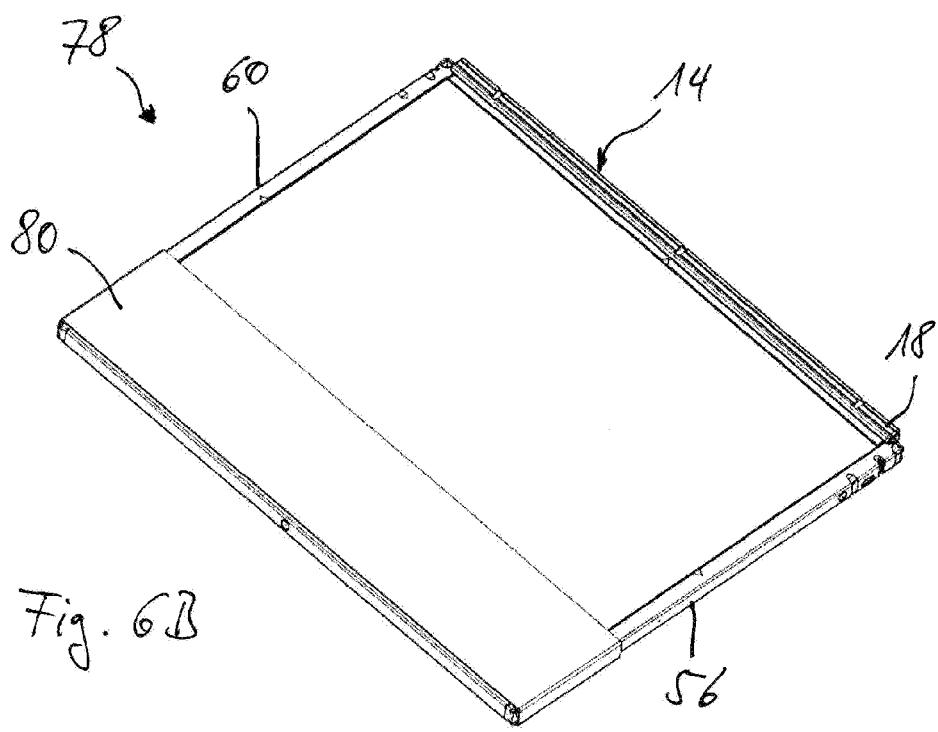

FIG. 6A and FIG. 6B show an X-ray cassette 78 with a moveable cover part 80 as a closure 48 for its opening 44. The cover part 80 extends here over the whole width of the X-ray cassette 78. The cover part 80 is moveably mounted on the side surfaces 56 and 60, and can be moved perpendicularly to the width extension of the X-ray cassette 78 along its cover surface. FIG. 6A shows the X-ray cassette 78 with the opening 44 open, and FIG. 6B with the opening 44 closed.

Figure 7B:
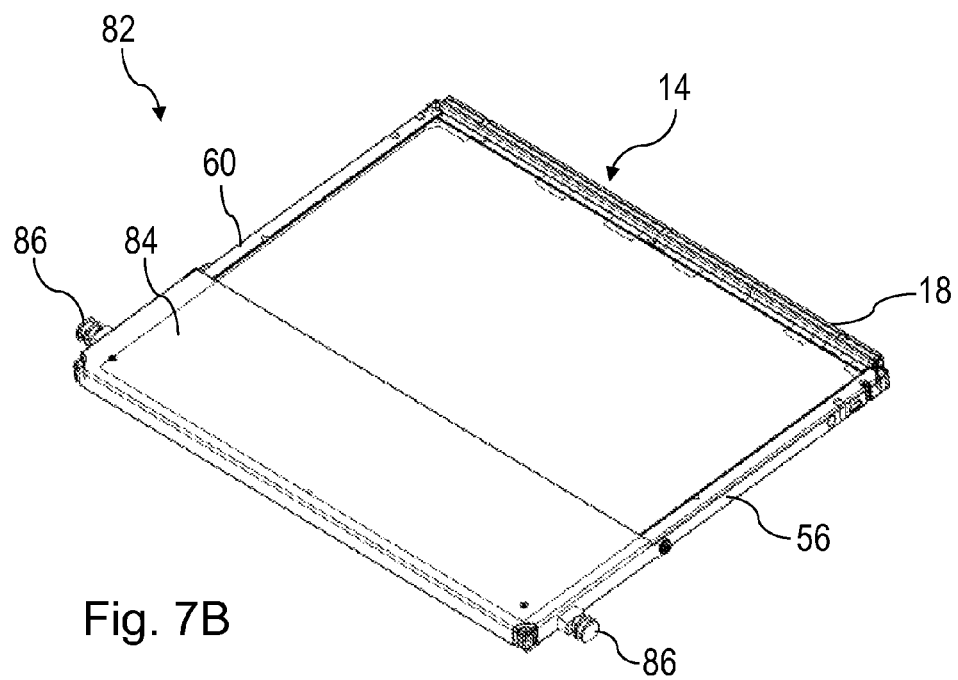

FIG. 7A and FIG. 7B show an X-ray cassette 82 with a pivotable cover part 84 as a closure 48 for its opening 44. The cover part 84 is pivotably mounted on both opposing side surfaces 56, 60 of the X-ray cassette 82. FIG. 7A shows the X-ray cassette 82 with the opening 44 open, and FIG. 7B with the opening 44 closed. There are advantageously disposed on the cover part 84 two snap closures 86 which in the closed state of the cover part 84 engage in corresponding holes which are provided in the side surfaces 56, 60.

FIG. 8 shows a top view of a receptacle 88 for receiving a number of storage phosphor plates. In the present exemplary embodiment the receptacle 88 can receive, for example, four storage phosphor plates. For this purpose it has a number of, i.e. in this case four, receiving chambers 90, 92, 94 and 96 the dimensions and geometries of which are matched to the storage phosphor plates to be received by the latter. Here the receiving chambers 90, 92, 94, 96 respectively have a rectangular geometry for correspondingly rectangularly designed, symmetrical storage phosphor plates. The receptacle 88 has a cover plate 98 and a base plate 100 located beneath the latter. The cover plate 98 and the base plate 100 are a distance away from one another and are connected to one another outside of the receiving chambers 90, 92, 94, 96 by means of an intermediate layer disposed between them. For each of the receiving chambers 90, 92, 94, 96 the cover plate 98 has a first recess 102 so that the cover plate 98 has four first recesses here 102. The first recesses 102 guarantee that with storage phosphor plates received by the receiving chambers 90, 92, 94, 96 the storage phosphor layers of the latter are substantially not covered and are freely accessible. Advantageously the first recesses 102 have substantially the sizes of the storage phosphor layers, and are located over the surfaces of the storage phosphor layers of the received storage phosphor plates when the storage phosphor plates are received.

There are provided in the cover plate 98 second recesses 104 assigned to the receiving chambers 90, 92, 94 and 96 which are adjacent here to the head sides of the first recesses 102. Furthermore, there are provided in the base plate 100 third recesses 106 assigned to the receiving chambers 90, 92, 94, 96 which are located beneath the second recesses 104. Together with recesses provided in the intermediate layer complete passages through the receptacle 88 are therefore formed on the head sides of the first recesses 102. Furthermore, there are provided in the cover plate 98 fourth recesses 108 assigned to the receiving chambers 90, 92, 94 and 96 which are adjacent here to the foot sides of the first recesses 102. Moreover, there are provided in the base plate 100 fifth recesses 110 assigned to the receiving chambers 90, 92, 94 and 96 which are located beneath the fourth recesses 108. Together with further recesses provided in the intermediate layer complete passages through the receptacle 88 are therefore also formed on the foot sides of the first recesses 102. The complete passages through the receptacle 88 on the head sides and the foot sides of the first recesses advantageously enable simple, secure and convenient introduction of the storage phosphor plates into the receiving chambers 90, 92, 94, 96 as well as simple, secure and convenient removal of the storage phosphor plates from the receiving chambers 90, 92, 94, 96. The passages and the recesses forming the latter advantageously have a partial circle here which enables particularly easy grasping of the storage phosphor plate, in particular by the operator.

There are provided in the base plate 100 sixth recesses 112 assigned to the receiving chambers 90, 92, 94 and 96 which serve for easy and reliable introduction of the storage phosphor plates into and removal of the storage phosphor plates from the receiving chambers 90, 92, 94, 96. The sixth recesses 112 are directly adjacent to the fifth recesses 110 here and are located beneath the first recesses 102. In this way a complete passage through the receptacle 88 is also formed with the sixth recesses 112. The sixth recesses 112 extend substantially over the whole width of the receiving chambers 90, 92, 94, 96 and are rectangular here. However, they can also be of any other suitable shape.

The cover plate 98 and the base plate 100 are connected to one another by means of the intermediate layer such that there are provided along the opposing long sides of the receiving chambers 90, 92, 94, 96, between the cover plate 98 and the base plate 100, track-shaped voids 114 for respectively receiving a peripheral region of the storage phosphor plates. The track-shaped voids 114 of the receiving chamber 96 are illustrated representatively in FIG. 8. The storage phosphor plates can be moved easily within these track-shaped voids 114 for introducing and removing. At the same time the storage phosphor plates located within the receiving chambers 90, 92, 94, 96 are held securely. This is particularly advantageous for the further processing of the storage phosphor plates held in the receptacle 88 in a read-out apparatus, such as that of the read-out apparatus 34 (FIG. 2). In particular for this further processing of the storage phosphor plates the receptacle 88 is made of a flexible material, in particular a flexible plastic material. This advantageously enables slight bending of the receptacle 88. In order to achieve even better holding of the storage phosphor plates in the receiving chambers 90, 92, 94, 96, small overlaps 116 can be formed in the cover plate 98 in peripheral regions of the first recesses 102, in particular in the region of their foot sides. Overlaps 116 are especially advantageous over the sixth recesses 112. In FIG. 8 these overlaps 116 are indicated as an example by the receiving chamber 90. Overlaps 116 can also be provided with the other receiving chambers 92, 94, 96. For reliable and easy grasping of the receptacle 88, in particular by the operator, the receptacle 88 has a notch 118 on one long side.

FIG. 9 shows as an example a cross-sectional view of the receptacle 88 according to FIG. 8 along section A-A. The cover plate 98 which is connected to the base plate 100 by means of an intermediate layer 120 is illustrated. The first recess 102 is located over the receiving chamber 96 in the cover plate 98. The track-shaped void 114 which is covered by the cover plate 98 can be seen on the long side of the receiving chamber 96. In this way reliable holding of the storage phosphor plate in the receiving chamber 96 is guaranteed.

Figure 10B:
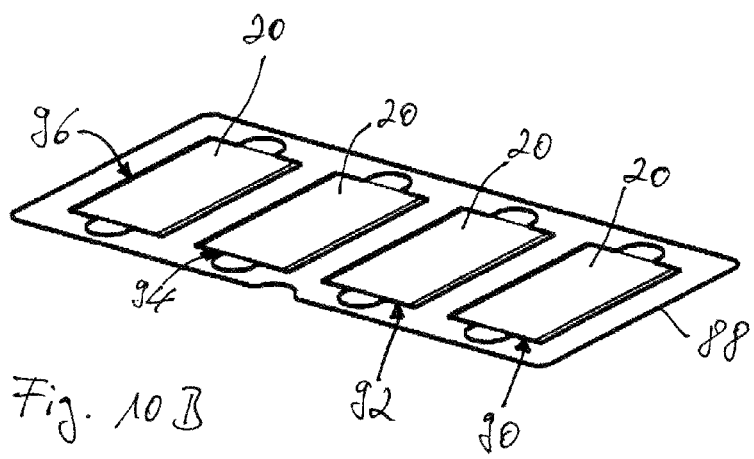

FIG. 10A and FIG. 10B show perspective views of the upper side of the receptacle 88 according to FIG. 8. FIG. 10A shows the receptacle 88 without received storage phosphor plates. FIG. 10B shows the receptacle 88 with received storage phosphor plates 20.

FIG. 11 shows a further diagrammatic illustration of the X-ray cassette 50 according to FIG. 3 with a receptacle 88 according to FIG. 8 located in its interior. In the illustration according to FIG. 11 the cover part 54 is removed from the X-ray cassette 50 so that the opening 44 is open. In this illustration storage phosphor plates 20 are located in the receiving chambers 90, 92, 94, 96 of the receptacle 88. With the cover part open 54 the receptacle 88 can be removed easily from the X-ray cassette 50, particularly by an operator. For this purpose the illustrated notch 118 of the receptacle 88 is particularly practical.

FIG. 12 shows a top view of a receptacle 122 with a receiving chamber 124 for a storage phosphor plate. The receiving chamber 124 has an asymmetrical shape here in order to make it clear that in principle storage phosphor plates of any shape can be received by a correspondingly designed receptacle. The principle for arranging and designing the different recesses 102, 104, 106, 108, 110 and 112 of the cover plate 98 and the base plate 100 corresponds largely to that of the receptacle 88. It will therefore not be discussed in any greater detail here, and in this regard reference is made to the above description of the latter.

In the following an example of a typical operating sequence according to the invention with reference to FIGS. 2 and 8 to 12 is described in greater detail.

After an X-ray is taken a receptacle 28, 88, 122 is loaded with one or more storage phosphor plates 20, the latter being pushed, placed and/or laid in the receiving chamber or chambers 90, 92, 94, 96, 124 in the receptacle 28, 88, 122 by an operator.

Next the operator introduces the loaded receptacle 28, 88, 122 into the X-ray cassette 42, 50, 78, 82 through a first opening 44 of the X-ray cassette 42, 50, 78, 82. The X-ray cassette 42, 50, 78, 82 can already be inserted with its second opening 14 in the feed device 32 of a read-out apparatus 34, the feed device 32 being configured such that the operator can easily access the first opening 44 with the X-ray cassette 42, 50, 78, 82 inserted. The closure 48, 54, 80, 84 of the first opening 44 is then closed.

The loaded receptacle 28, 88, 122 is then conveyed into the read-out device 34 through the second opening 14 of the X-ray cassette 42, 50, 78, 82 fed into the feed device 32 of the read-out apparatus 34 and forwarded to a scanner located in the read-out device 34 on which the storage phosphor plate 20 is read out while the latter is located in the receptacle 28, 88, 122. Preferably any residual information remaining in the storage phosphor plates 20 is then deleted by irradiating with deleting radiation.

After the read-out the loaded receptacle 28, 88, 122 is returned to the X-ray cassette 42, 50, 78, 82 through the second opening 14 of the X-ray cassette located in the feed device 32 of the read-out apparatus 34.

The receptacle 28, 88, 122 is then removed by the operator from the X-ray cassette 42, 50, 78, 82 through the first opening 44 of said X-ray cassette. Finally the read out storage phosphor plates 20 can be removed from the receptacle 28, 88, 122 and are available for the taking of further X-rays.

The invention claimed is:

1. A system having an X-ray cassette comprising a receptacle for receiving at least one storage phosphor plate, the receptacle being designed such that the storage phosphor plate is present in the receptacle when the storage phosphor plate is being read-out in a read-out apparatus and can be removed from the receptacle after the read-out, and a first opening and a second opening, the receptacle being introduced by an operator into the X-ray cassette through the first opening together with the at least one received storage phosphor plate, and being removed from the X-ray cassette through the second opening and being conveyed into the interior of the read-out device when the X-ray cassette with the second opening is fed into the read-out apparatus and the read-out apparatus is operated to read-out the storage phosphor plate received in the receptacle, the read-out apparatus including a feed device for feeding the X-ray cassette, and the feed device being designed such that in the event that the X-ray cassette with the second opening is fed into the feed device, the first opening of the X-ray cassette is accessible for an operator.

2. The system according to claim 1 further comprising two closures for closing the two openings.

3. The system according to claim 1, the X-ray cassette including four narrow side surfaces and two wide side surfaces, and the second opening being formed on a narrow side surface of the X-ray cassette.

4. The system according to claim 1, the X-ray cassette including four narrow side surfaces and two wide side surfaces, and the first opening being formed on a wide side surface of the X-ray cassette.

5. The system according to claim 4, further comprising a closure for closing the opening formed on the wide side surface with a detachable cassette part.

6. The system according to claim 4, further comprising a closure for closing the opening formed on the wide side surface with a cassette part moveable along the wide side surface of the X-ray cassette.

7. The system according to claim 4, further comprising a closure to close the opening formed on the wide side surface with a pivotable cassette part.

8. The system according to claim 2, wherein provided in the region of a closure edge, on which a side surface of the X-ray cassette and a closure of an opening meet in the closed state, a screen or an overlap in which the closure and the side surface of the X-ray cassette overlap, by means of which the closure edge is covered so as to be impermeable to light.

9. The system according to claim 2, wherein at least one of the closures is closeable with a catch spring.

10. A method for reading out storage phosphor plates, comprising:
loading a receptacle with at least one storage phosphor plate and introducing the loaded receptacle into an X-ray cassette through a first opening of the X-ray cassette,
removing the loaded receptacle from the X-ray cassette through a second opening of the X-ray cassette which is fed into a read-out apparatus, and reading out the storage phosphor plate located in the removed receptacle,
returning the loaded receptacle into the X-ray cassette fed into the read-out apparatus through the second opening of the X-ray cassette, and
removing the receptacle from the X-ray cassette through the first opening of the X-ray cassette and removing the read out storage phosphor plate from the receptacle.

11. The method according to claim 10, wherein the cassette further comprises two closures for closing the two openings.

12. The method according to claim 10, wherein the X-ray cassette includes four narrow side surfaces and two wide side surfaces, and the second opening being formed on a narrow side surface of the X-ray cassette.

13. The method according to claim 10, wherein the X-ray cassette includes four narrow side surfaces and two wide side surfaces, and the first opening being formed on a wide side surface of the X-ray cassette.

14. The method according to claim 13, wherein the X-ray cassette further includes a closure for closing the opening formed on the wide side surface with a detachable cassette part.

15. The method according to claim 13, wherein the X-ray cassette further includes a closure for closing the opening formed on the wide side surface with a cassette part moveable along the wide side surface of the X-ray cassette.

16. The method according to claim 13, wherein the X-ray cassette further includes a closure to close the opening formed on the wide side surface with a pivotable cassette part.

17. The method according to claim 10, wherein provided in the region of a closure edge, on which a side surface of the X-ray cassette and a closure of an opening meet in the closed state, providing a screen or an overlap in which the closure and the side surface of the X-ray cassette overlap, by means of which the closure edge is covered so as to be impermeable to light.

18. The method according to claim 10, wherein the cassette further comprises two closures for closing the two openings and at least one of the closures is closeable with a catch spring.

\* \* \* \* \*